Nov. 20, 1928.
O. A. BANNER
OIL ENGINE
Filed Oct. 4, 1924
1,692,150
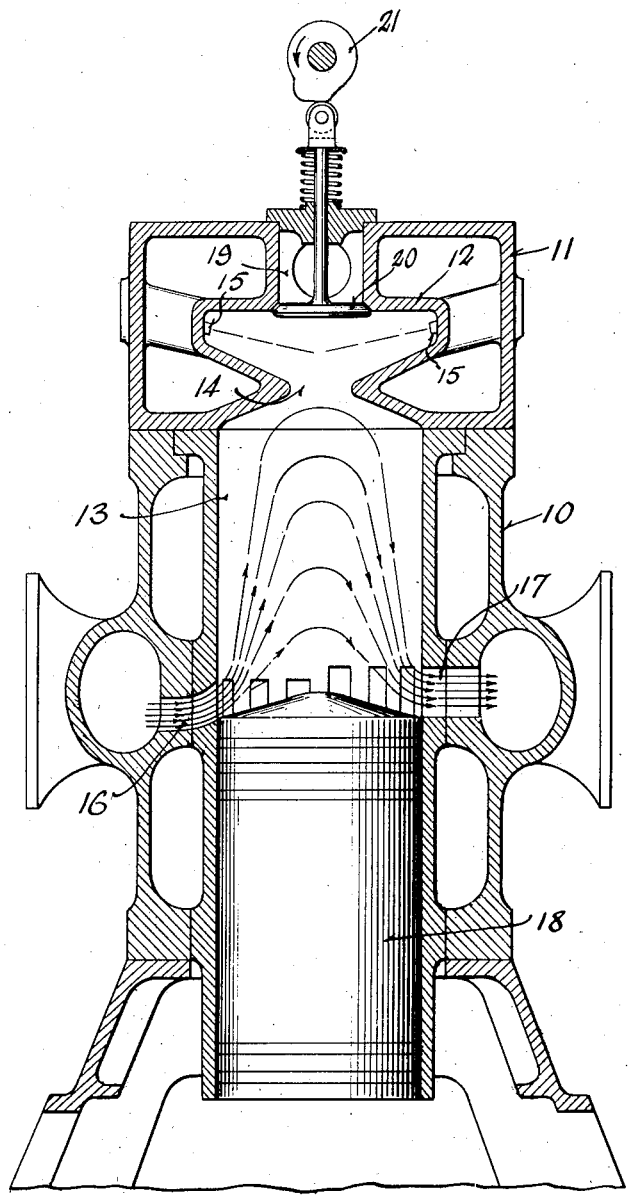
INVENTOR.
OTTO A. BANNER
BY Ralph A. Brown
ATTORNEY.

Patented Nov. 20, 1928.

1,692,150

UNITED STATES PATENT OFFICE.

OTTO A. BANNER, OF MILWAUKEE, WISCONSIN.

OIL ENGINE.

Application filed October 4, 1924, Serial No. 741,639, and in Germany October 5, 1923.

This invention relates to internal combustion engines of the type in which the cylinders are provided with a combustion chamber communicating therewith through a restricted throat.

Little success has heretofore been had with two cycle engines of this type. This is due largely to the great difficulty experienced in effecting good scavenging. For good results, the scavenging air must be admitted to the cylinder in such manner as to force out the products of combustion without mixing to any great extent therewith. Any mixture of the air with the burnt gases increases the amount of burnt gases remaining in the cylinder and consequently reduces the amount of pure air available to support combustion.

In two cycle engines involving the use of cylinders of usual regular form, good scavenging is commonly effected by the use of air inlet and exhaust passages disposed in the opposite walls of the cylinder and controlled by the piston. The arrangement is ordinarily such that when the inlet passages are uncovered by the piston air admitted therethrough under pressure is deflected upwardly so as to sweep before it and remove practically all the burnt gases from the cylinder through the exhaust passages. This arrangement alone cannot be relied upon, however, to clear the combustion chamber of burnt gases in that type of engines in which the combustion chamber of each cylinder communicates with the piston space through a restricted throat.

One object of the present invention is the provision of a novel method and means for effecting thorough scavenging of the combustion chamber as well as the piston space in two cycle engines of this type.

Other objects and advantages will appear from the following description of an illustrative embodiment of the present invention.

The single figure of the drawing is a sectional view of an engine cylinder embodying the present invention.

The engine cylinder 10 is provided with a water cooled head 11 having an elongated combustion chamber 12 therein communicating with the piston space 13 through a relatively narrow throat 14. In the cylinder shown liquid fuel is supplied under pressure through two opposed injection nozzles 15 of appropriate form disposed at the opposite ends of the combustion chamber 12. The cylinder is provided with the usual arrangement of air inlet passages 16 and exhaust passages 17 oppositely disposed in the walls thereof and controlled by the piston 18, so that, as these passages are uncovered by the piston as it approaches the lower limit of its stroke, scavenging air is admitted under pressure through passages 16 and sweeps through the piston space in the general direction of the arrows, forcing all the burnt gases before it and out through the passages 17.

Provision is also made for removing the burnt gases from the combustion chamber 12 into the piston space during the scavenging process just described. This must be accomplished without interfering with the natural flow of the air or gases in the piston space. To this end, the cylinder shown is provided with an air inlet port 19 entering the combustion chamber 12, preferably through the top wall thereof. This port is open to a source of scavenging air under pressure and is controlled by a valve 20. Valve 20 is actuated and controlled by any appropriate means, such as a cam 21. The arrangement and shape of the cam is such that during the early part of the scavenging process hereinabove described the valve 20 is opened a very little to admit small quantities of air to enter the combustion chamber 12. The admission of this air removes most of the burnt gases from the chamber 12 causing them to pass through the throat 14 at a velocity low enough so as not to interfere with the flow of air and gases in the piston space. The burnt gases thus entering the piston space are effectively carried off by the flow.

Then as the piston begins its upward stroke and covers the passages 16 and 17 the valve 20 is opened to its full extent for a short interval of time so as to remove all traces of burnt gases from the combustion chamber and to effect a full charge of clean air to the cylinder.

The disposition of the fuel injection nozzles at the ends of the combustion chamber permits the top wall of the combustion chamber to be fully exposed to the cooling water. This wall is thus amply protected against the intensive heat ordinarily developed in the chamber and all danger of cracking, which is so common in the cylinder heads of other large two cycle engines, is avoided. In fact, an elongated chamber of the form shown offers a maximum cooling surface and thus reduces to a minimum the internal stresses set up in the chamber walls due to the heat of combustion.

The use of a valve in the upper wall of the chamber not only serves to effectively remove the burnt gases but also serves to effectively cool the chamber between working strokes of the piston.

Various changes may be made in the embodiment of the invention hereinabove described, without departing from or sacrificing any of the advantages of the invention as defined in the appended claims.

I claim:

1. In a two cycle oil engine the combination of a cylinder having a piston space, a piston therein, a combustion chamber, a restricted throat between said chamber and space, oppositely disposed intake and exhaust passages in the walls of said space controlled by said piston, an air inlet valve in said chamber, and means for opening said valve slightly while said exhaust passages are open and for opening said valve fully after said passages are closed.

2. In a two cycle engine the combination of a cylinder having a piston space, a piston therein, an elongated combustion chamber, a restricted passage between said chamber and space, a fuel injection nozzle at each end of said chamber, and means for admitting a blast of air directly to said combustion chamber after each down stroke of said piston.

In witness whereof, I hereunto subscribe my name this 2nd day of October, 1924.

OTTO A. BANNER.